July 7, 1942.   R. L. ROLAND   2,288,843
TEMPERATURE CONTROL SYSTEM
Filed July 5, 1938   2 Sheets-Sheet 1

Inventor:
Ralph L. Roland,
By: Tefft + Tefft
Attorneys

July 7, 1942.    R. L. ROLAND    2,288,843
TEMPERATURE CONTROL SYSTEM
Filed July 5, 1938    2 Sheets-Sheet 2
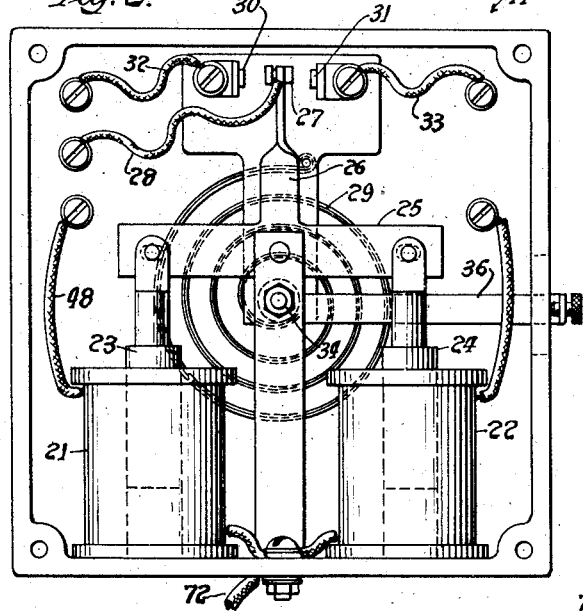
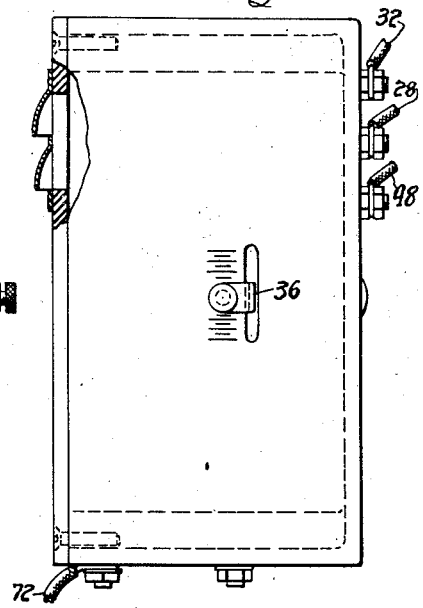
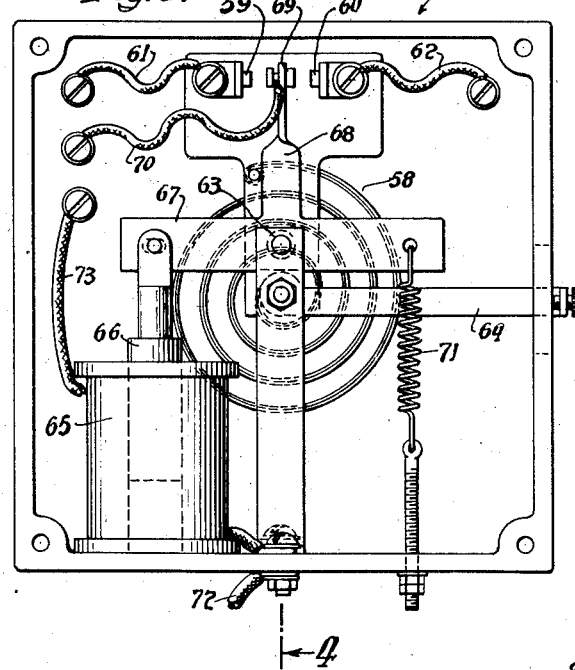
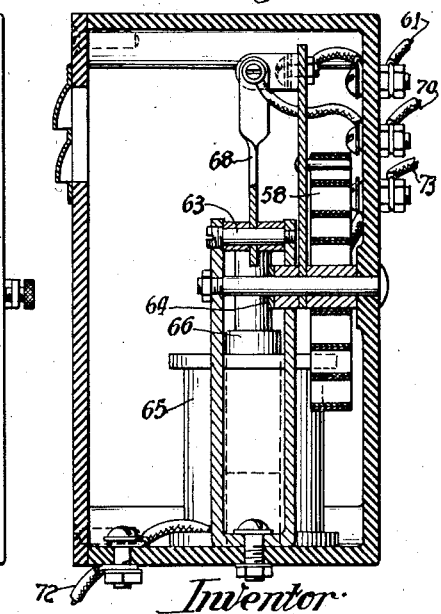
Inventor
Ralph L. Roland,
By Tefft + Tefft
Attorneys.

Patented July 7, 1942

2,288,843

UNITED STATES PATENT OFFICE 2,288,843

TEMPERATURE CONTROL SYSTEM

Ralph L. Roland, Bloomington, Ill.

Application July 5, 1938, Serial No. 217,330

4 Claims. (Cl. 257—3)

This invention relates to a control system for regulating the heating and cooling of buildings and for maintaining them at the desired temperature. It is generally recognized by skilled heating engineers that proper temperature control of buildings is dependent upon the balance of several factors including outside weather and temperature, inside temperature, building tightness and insulation and the efficiency of the heating and cooling equipment.

The principal object of my invention is to provide a system of controls which can be balanced in a manner that will result in substantially uniform interior temperatures in various kinds of buildings under widely variable conditions.

Another object is to provide a control system involving comparatively simple, sturdy control apparatus that may be easily installed, wired and adjusted by ordinary electricians guided by simple instructions.

Other objects and benefits will be disclosed in the following descriptions, illustrations and claims.

The drawings as shown are somewhat diagrammatic in form, and it will be understood that conventional variations in the structures are to be expected and are contemplated. As an example where electrical contacts are shown as simple contact points, snap action or mercury switches may be substituted when such use is indicated by good practice. Also friction of resistance contacts might be eliminated by the use of mercury tube resistance devices. The drawings are for illustration only and I do not desire to be limited to the construction shown except as such limitations are opposed by the appended claims.

Now referring to the illustrations:

Fig. 2 is a front elevation view of my double solenoid balance thermostat with the cover of the box removed; and showing the mechanical structure as described in the specifications;

Fig. 3 is a side elevation view of my double solenoid balance complete in a box showing the adjustment arm and adjustment graduations;

Fig. 4 is a side elevation sectional view of my single solenoid balance as it would appear on section line 4—4 on the center line of Fig. 5; and Fig. 5 is a front elevation view of my single solenoid balance with the cover removed and showing the mechanical structure described in the specifications.

Figure 1:
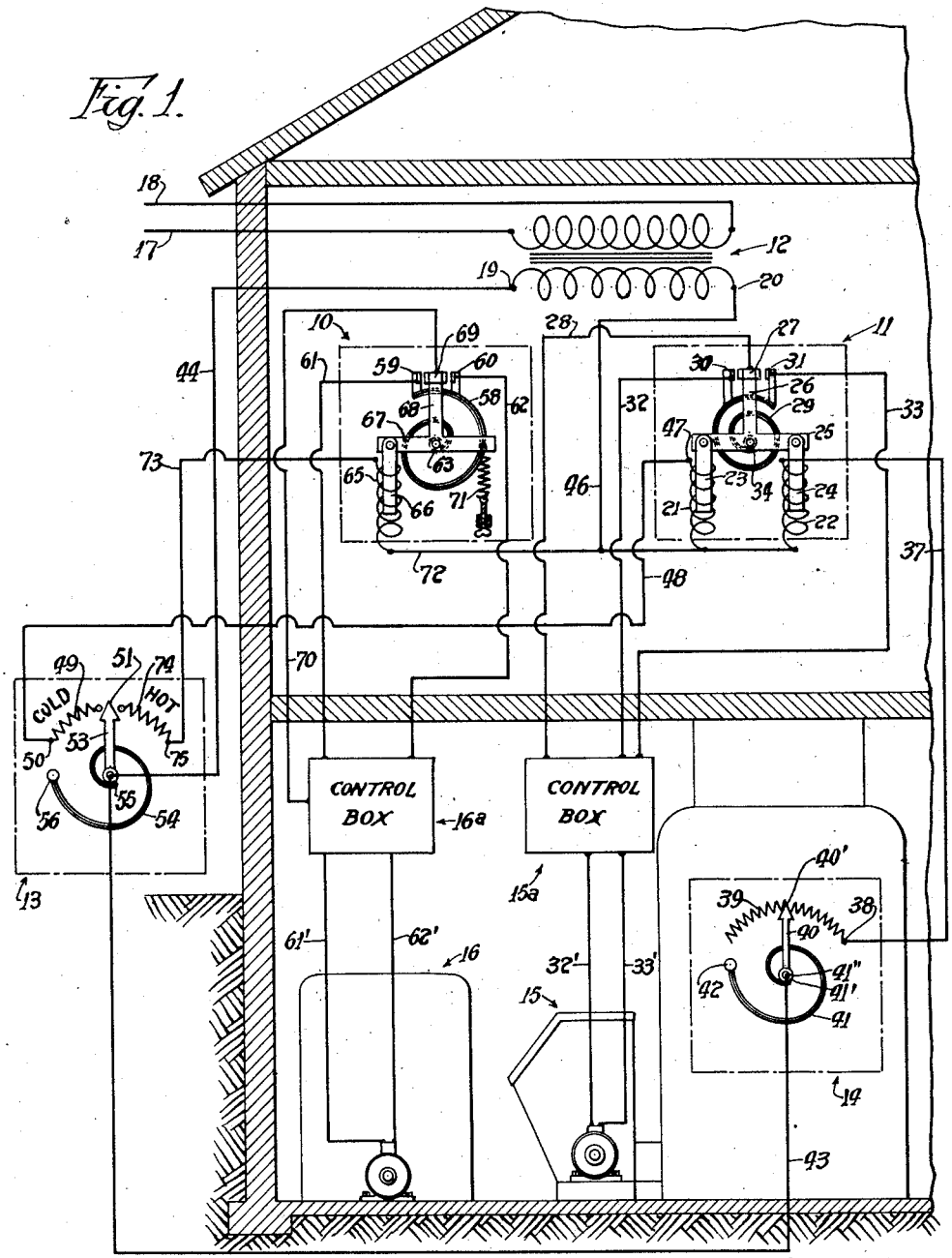
Fig. 1 is a diagrammatic illustration of the installation of my control apparatus in a building shown in cross section; this figure is intended to be diagrammatic, only, to show the position of the several elements in the building and to show the electrical connections between each of the elements.

Now referring to Fig. 1. The numeral 10 generally designates my single solenoid balance thermostat for controlling an air conditioning, and cooling apparatus. The numeral 11 generally designates my double solenoid balance thermostat for controlling the heating apparatus. The numeral 12 generally designates a transformer for reducing standard incoming high voltage current to low voltage for easier and safer use. The numeral 13 designates generally my outdoor thermostat with a resistance element controlled by a shifting contact. The numeral 14 designates generally my heater thermostat with resistance element also controlled by shifting contact. The numeral 15 designates a motor driven heating apparatus of any conventional type and the numeral 15a a control box containing a conventional relay switch for the motor circuit. The numeral 16 designates an air cooling or conditioning unit of any conventional type and the numeral 16a the control box for this unit. It is understood that standard motor current is fed into these control boxes and switched off and on by conventional relay switches.

The balances 10 and 11 are shown connected to transformer 12, and thermostats 13 and 14 controlling the heating apparatus 15 and the refrigeration unit 16.

Transformer 12 is connected to a 110 volt or any standard voltage line through conductors 17 and 18. The secondary of this transformer is brought out at 19 and 20.

The heat balance 11 (also shown in Fig. 2) has two solenoid coils 21 and 22. Working in these coils are armatures 23 and 24, connected to the balance beam 25 which has an arm 26 securely connected to it and carrying contact 27. Contact 27 is connected to the relay switch, not shown, in control box 15a.

This balance also has a bimetallic spring 29 having contacts 30 and 31 insulated from but secured to it, but this end of spring is free to move in arc of the contact 27 as it is held so by an arm that moves loosely on shaft at the same point 34. The other end of the bimetallic spring is secured at 34 to a bushing fitted loosely to a shaft at 34. The bushing also has an arm 36 attached (shown in Fig. 2) which is used to adjust the room temperature. Contacts 30 and 31 connect to the heating apparatus switch in control box 15a which controls current to the motor leads 32' and 33' through conductors 32 and 33. Only contact 30 is used when the heating apparatus is controlled by a make and break contact; but both 30 and 31 are used when a three wire control is used.

Coil 22 is connected to the thermostat 14 by conductor 37 at 38 to the resistance 39 which makes contact at 40' with the arm 40 on the bimetallic spring 41, which is mounted on a bushing 41' and shaft 41'' at this point. Spring 41 is secured at point 42 to frame of the thermostat. Spring 41 is connected by conductors 43 and 44 to the secondary lead 19 of the transformer 12.

The other solenoid coil 21 of the balance 11 is connected at 47 to a conductor 48 thereby to the resistance 49 at 50. Resistance 49 makes contact at 51 with arm 53 which is attached to a bimetallic spring 54 at 55. The other end of the bimetallic spring is secured at 56 to the frame of the thermostat. The spring 54 is connected to the secondary of the transformer 12 at 19 by conductor 44.

The air conditioning balance 10 (also shown in Fig. 5) has a bimetallic spring 58, carrying on the movable end contacts 59 and 60 which are attached thereto but insulated from it. The conductors 61 and 62 attached to these contacts run to a conventional relay switch in the control box 16a controlling current to the motor leads 61' and 62' and, like balance 11, only 61 is used in circuit where a make and break contact is used and both when a three wire system is used. The other end of the spring 58 is fastened to a bushing moving on a shaft at 63. The bushing has an arm attached to adjust the room temperature. This arm is 64 (shown only on Fig. 5). The solenoid coil 65 having armature 66 connected to balance beam 67, which has arm 68 secured to it, which in turn has the contact 69 attached. Contact 69 is attached to the control 16a through the conductor 70. The other end of the balance beam 67 has an adjustable tension spring 71 attached, working against solenoid coil 65. The solenoid coil 65 is attached to conductor 72, and conductor 46 connecting to the secondary of the transformer 12 at 20. The other end of the solenoid coil leads through conductor 73 to the thermostat 13 and attaches to the resistance 74 at 75. Resistance 74 connects with the arm 53 which is secured to the bimetallic spring 54 at 55. Conductor 44 connects the bimetallic spring 55 to the secondary of the transformer 12 at 19.

The heat balance is so constructed that when the temperature on the outside of the building drops below 72 degrees the thermostat 13 goes into the heating cycle. The bimetallic spring 54 pulls arm 53 over into contact with the resistance 49 completing the circuit with the transformer secondary and the solenoid coil 21. The current flows through coil 21 and the balance beam is moved down by the armature 23, causing arm 26 to place contact 30 in touch with contact 27, starting the heating apparatus to put out heat, which heats the bimetallic spring 41 of thermostat 14 moving the arm to the right, reducing the resistance of 39, causing more current to flow through conductor 37 and solenoid coil 22 of balance 11 pulling the balance beam 25 down towards coil 22 moving arm 26 and contact 27, attached thereto, away from contact 30 towards 31 where it makes contact with 31 or breaks contact with 30, thereby stopping the heat.

If the temperature outside of the building at the thermostat 13 drops more, the same process is gone through, giving more heat to the heating unit.

The heat at the thermostat 14 must cut the resistance of 39 to match the amount cut by the cold at the thermostat 13 at 49, and at the same time satisfies the thermostatic action of the bimetallic spring of the balance 11.

When the temperature outside of the building at the thermostat 13 goes above 72 degrees arm 53 leaves resistance 49, thereby turning off the heat and making contact with 74 which picks up the current of the transformer 12 through conductor 44 and flows the current through solenoid coil 65 of balance 10, pulling balance beam 67 down towards coil 65 moving arm 68 and contact 69 to contact 59 starting the air conditioning unit 16.

When the room cools, the bimetallic spring 58 of the balance 10 pulls contact 60 over to 69; thereby breaking the contact with 59, the refrigerating unit is stopped. If a make and break contact is all that is needed, the conductor 62 may be omitted and only used for a three wire system.

As the temperature at the thermostat 13 rises, more resistance is cut off 74 by arm 53, causing more current to flow through coil 65 of the balance 10 causing contact 69 to move to the left which would permit the temperature of the room to rise in proportion to the outside. This is not desired so spring 71 is so arranged that the tension will hold back this movement so that the room temperature will not rise as fast as the outside temperature.

I claim:

1. A temperature control apparatus for an enclosure having a heat source, said apparatus including a master thermostat within the enclosure, having a minimum limit electrical contact, a maximum limit electrical contact, energizing contacts shiftable between said minimum and maximum limit contacts, temperature-sensitive means to impart relative movement to said contacts responsive to temperature variations within the enclosure, a manually shiftable adjustment for said contact, and an automatic compensating adjustment arranged to shift said contacts and alter the critical temperatures of the thermostat to raise the critical temperatures of the master thermostat in response to a decrease in temperature outside of the enclosure, and to lower the critical temperatures of the thermostat responsive to an increase in the temperature of the heat source, said automatic compensating adjustment comprising an electromagnetic coil having an armature, a second electro-magnetic coil having an armature mechanically coupled to the armature of the first coil and to the said contacts and arranged to shift the adjustment of the contacts, an outside compensating thermostat including a variable resistance electrically connected to one of the aforementioned electro-magnetic coils and mechanically coupled to a temperature-sensitive element to be actuated thereby to reduce the resistance responsive to a decrease in temperature; and a second compensating thermostat at the heat source including a variable resistance electrically coupled to the other of the aforementioned electro-magnetic coils and mechanically coupled to a temperature-sensitive element to be actuated thereby to reduce the resistance responsive to increases in temperature of the heat source.

2. A temperature control apparatus for an enclosure having a heat source, said apparatus consisting of a master thermostat within the enclosure and a pair of compensating thermostats; said master thermostat including a minimum limit electrical contact, a maximum limit electrical contact, energizing contacts shiftable between said minimum and maximum limit contacts, temperature-sensitive means to impart relative movement to said contacts responsive to temperature variations within the enclosure, a manually shiftable adjustment for said contacts, said compensating thermostats being arranged to shift said contacts and alter the critical temperatures to raise the critical temperature of the master thermostat in response to a decrease in temperature outside of the enclosure, and to lower the critical temperatures of the thermostat responsive to an increase in the temperature of the heat source, said compensating thermostats including an outside compensating thermostat including a variable resistance electrically connected to the master thermostat and mechanically coupled to a temperature-sensitive element to be actuated thereby to reduce the resistance responsive to a decrease in temperature; and a second compensating thermostat at the heat source including a variable resistance electrically coupled to the other of the master thermostat and mechanically coupled to a temperature-sensitive element to be actuated thereby to reduce the resistance responsive to increases in temperature of the heat source.

3. In a temperature control system for buildings, dual indoor space thermostats, a bi-metallic outdoor thermostat connected to dual electric circuits separated at the comfortable temperature point, dual resistance elements actuated by said thermostat, one of said elements being actuated in the cold range setting of the thermostat to raise the setting of the space thermostats and the other in the hot range setting to lower the setting of the space thermostats, one of said dual indoor space thermostats being a dual solenoid control thermostat for controlling the heating apparatus having one solenoid interconnected with said cold range resistance circuit, the other indoor space thermostat for controlling cooling and air conditioning apparatus interconnected with the hot range resistance circuit, a heater thermostat actuating a resistance element connected in circuit with the other of said dual solenoid elements, and a transformer having a low voltage circuit connecting said control apparatuses through relay switches to control the power circuits whereby the heating and cooling apparatuses are started and stopped to maintain desired interior temperatures by a balanced adjustment of the interconnected control apparatuses.

4. In a temperature control system for buildings, dual indoor space bi-metallic thermostats, a bi-metallic outdoor thermostat connected to dual electric circuits, separated at the comfortable temperature point, dual resistance elements actuated by said thermostat, one of said elements being actuated in the cold range setting of the thermostat to raise the setting of the space thermostat and the other in the hot range setting to lower the setting of the space thermostats, one of said dual indoor space thermostats being a dual solenoid control thermostat for controlling the heating apparatus having one solenoid interconnected with said cold range resistance circuit, the other indoor space thermostat for controlling cooling and air conditioning apparatus interconnected with the hot range resistance circuit, a heater bi-metallic thermostat actuating a resistance element connected in circuit with the other of said dual solenoid elements, and a transformer having a low voltage circuit connecting said control apparatuses through relay switches to control the power circuits whereby the heating and cooling apparatuses are started and stopped to maintain desired interior temperatures by a balanced adjustment of the interconnected control apparatuses.

RALPH L. ROLAND.